May 6, 1969

J. H. WHITE 3,442,232

EFFLUENT CLEANER FOR WASTE BURNER

Filed Nov. 9, 1967

INVENTOR.
JOHN H. WHITE
BY
Lothrop & West
ATTORNEYS

INVENTOR.
JOHN H. WHITE
BY
Lothrop & West
ATTORNEYS

United States Patent Office 3,442,232
Patented May 6, 1969

3,442,232
EFFLUENT CLEANER FOR WASTE BURNER
John H. White, 6494 Leonard Drive,
Redding, Calif. 96001
Filed Nov. 9, 1967, Ser. No. 681,711
Int. Cl. F23g 5/00; F23j 3/00; B01d 47/12
U.S. Cl. 110—18                                  7 Claims

ABSTRACT OF THE DISCLOSURE

Located above a furnace such as a waste lumber burner, or incinerator, is an enclosure housing various cooperating structures arranged to receive the still-burning and burned effluent material, and to direct the material through a predetermined sequence of quenching, scrubbing and filtering steps culminating in the discharge to the atmosphere of gases substantially devoid of noxious compounds.

---

The invention relates to improvements in cleaners for effluent from waste burners and incinerators.

The latter years have witnessed an ever-increasing need for the reduction, and eventual elimination, of pollutants from man's environment. Heretofore, attempts have been made, utilizing screens and other comparable expedients, to separate the unwanted particulate materials from the normal gaseous products of combustion. These efforts have yielded but a moderate degree of success, and altogether too frequently the discharge still retains large amounts of undesirable material.

It is therefore an object of the invention to provide an apparatus which is capable of removing substantially all the undesirable pollutants from flue gases.

It is another object of the invention to provide an effluent cleaner for waste material burners which is relatively compact, yet efficient, and which is relatively economical with respect to original cost as well as operation and maintenance.

It is still a further object of the invention to provide a cleaner for incinerator gases which can be operated by relatively unskilled personnel and which, when once properly set, will operate reliably for protracted periods of time.

It is another object of the invention to provide a generally improved effluent cleaner for waste material burners.

Other objects, together with the foregoing, are attained in the embodiment described in the following description and illustrated in the accompanying drawings in which.

Figure 1:
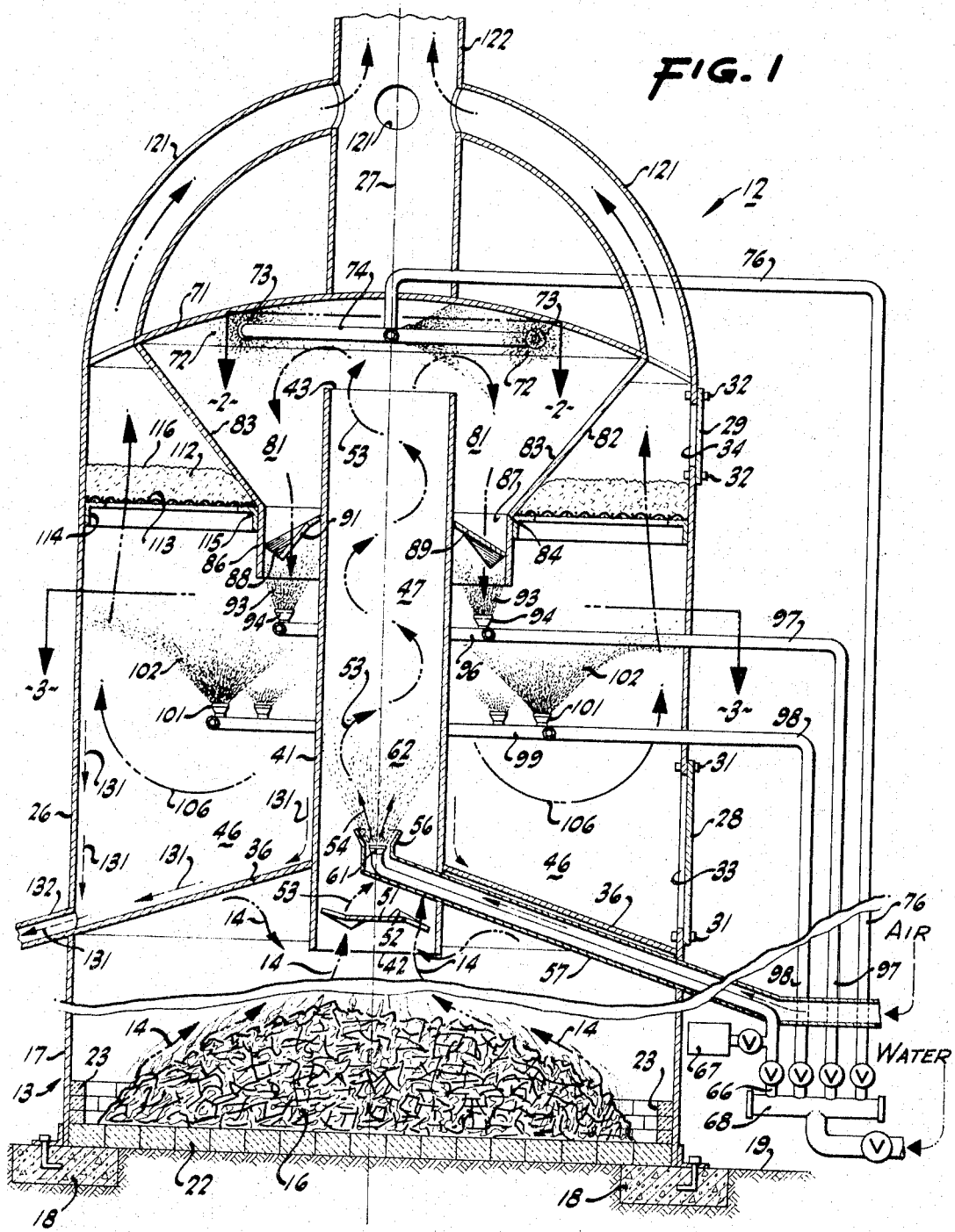
FIGURE 1 is a vertical, median, sectional view of the cleaner mounted on a typical waste material burner, portions of the figure being broken away to reduce the extent of the figure.
Figure 2:
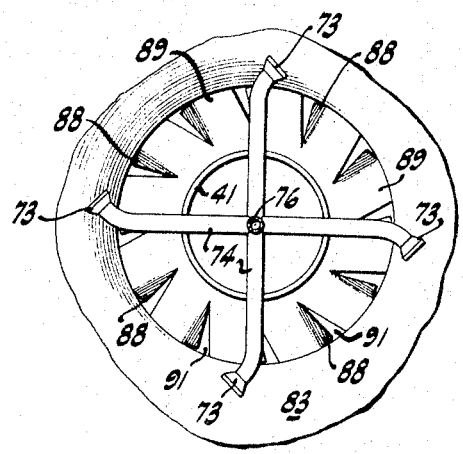
FIGURE 2 is a sectional view, to an enlarged scale of the upper spray structure and the subjacent reverse swirl passageway, the plane of the section being indicated by the line 2—2 in FIGURE 1.
Figure 3:
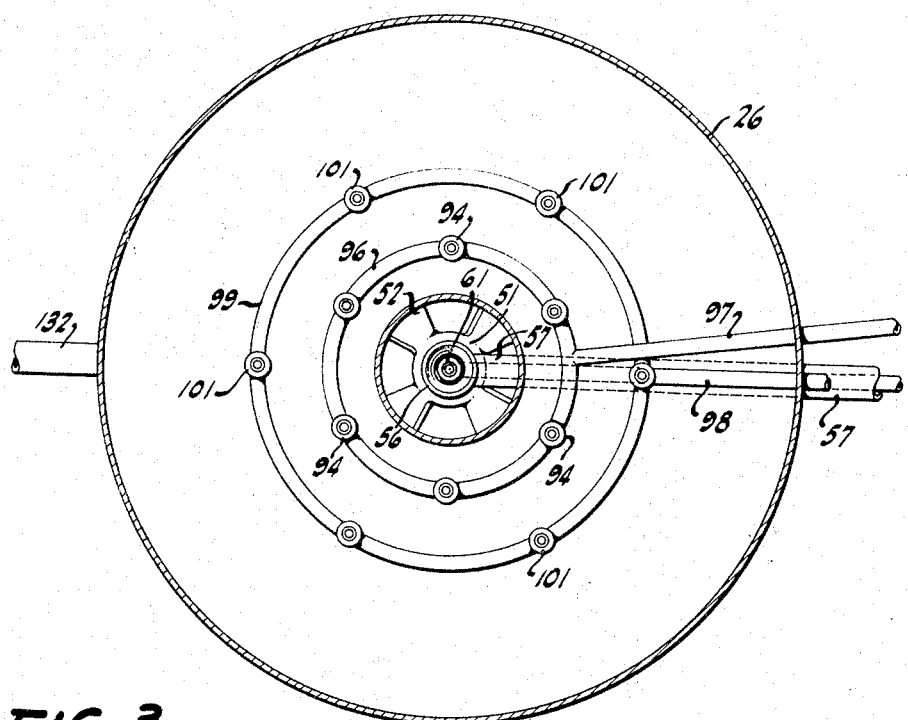
FIGURE 3 is a sectional view, the plane of the section being indicated by the line 3—3 in FIGURE 1.

While the apparatus of the invention is susceptible of numerous physical embodiments depending upon the environment and requirements of use, substantial numbers of the herein shown and described embodiment have been made, tested and used, and all have performed in an eminently satisfactory manner.

The effluent cleaner of the invention, generally designated by the reference numeral 12, is preferably located above a waste material burner 13, such as a trash lumber burner, to receive the rising effluent gases 14, and attendant solid, particulate materials carried with the gases from the burning pile 16.

Conveniently, the incinerator 13 is defined by vertical circular cylindrical side walls 17 supported on footings 18 set in the ground 19. If desired, a firebrick floor 22 and walls 23 can be utilized to protect the side walls 17, usually formed of rolled steel plate, and to afford ease of clean-out.

Mounted on top of the burner 13 and forming an upward extension thereof is the cleaner 12, the cleaner comprising a steel, right circular cylindrical jacket 26 having a vertical axis 27 coincident with the axis of the burner side walls 17.

A lower manhole cover 28 and an upper manhole cover 29 can be removed by undoing the attendant fastenings 31 and 32, thus affording access to the interior through respective openings 33 and 34 in the cylinder side walls 26.

The bottom end of the cleaner 12 is substantially closed by a frusto-conical lower end plate 36 pierced centrally by a circular opening having disposed therein the lower end of a vertical conduit 41 extending from an open bottom end 42 to an open top end 43.

Owing to its relatively large size, the annular space defined by the outer side walls 26 and the walls of the central conduit 41 is termed a main chamber 46. The space inside the vertical conduit 41 is designated as a primary mixing chamber 47.

The hot effluent 14 arising from the burning pile 16 is guided into the lower end 42 of the primary mixing chamber 47, and, in flowing swiftly upwardly therethrough, is subjected almost immediately to the effects of a transverse swirl member 51 having a plurality of propeller-like guide vanes 52 serving to impart a violent swirling motion to the gases and entrained particles, as indicated by the spiral arrows 53.

The upward velocity of the material in the primary mixing chamber 47 is further augmented by a strong, upwardly directed air blast 54 emerging from a flared mouth 56 connected to a diagonal air pipe 57 extending through the conduit and jacket wall 26 to a suitable nearby compressed air supply (not shown).

Located within the flared mouth 56 of the air pipe is a nozzle 61 directing upwardly a high velocity, fine spray of fluid 62 which quickly partakes of the upward, spiral movement of the hot gases.

The nozzle 61 is so constructed as to project a spray reaching the encompassing walls 41 of the primary mixing chamber 47, and thereby affords a dense spray screen capable of capturing large numbers of the particulate solids entrained within the effluent.

The fluid 62 emergent from the nozzle 61 is preferably made up of water mixed with a suitable quantity of a surface active agent (surfactant), such as a detergent, injected into the water line 66 from a detergent reservoir 67.

A conventional metering device (not shown) is used to control the amount of detergent introduced into the water line. Conveniently, the water line 66 is connected to a manifold 68, or hydrant, leading from a suitable water supply.

In the alternative, a reservoir containing a pre-mixed supply of surfactant could be used.

As the high velocity surfactant spray progresses upwardly with the swirling effluent, any still-burning particles are quenched and the temperature of the effluent is reduced. Furthermore, as stated above, many of the entrained solids are wetted and, in effect, captured.

Upon emerging from the upper end 43 of the mixing chamber 47, the effluent is deflected laterally and recurved downwardly by an arched dome 71 spanning and substantially enclosing the upper end of the cylindrical cleaner jacket 17.

Concurrently, a plurality of fine sprays 72 of water are directed against the still-swirling effluent-surfactant mixture in a counter-flow direction. That is to say, a plurality of nozzles 73 carried on the ends of radial feeder pipes 74 leading from a water supply line 76 are directed substantially tangentially in a direction opposing the direction of the residual swirling motion of the effluent. If it should be desired, the water leading from the manifold 68 and through the supply line 76 can also be injected with a metered supply of detergent from the reservoir 67, in the manner previously described. In this event, a suitable conduit (not shown) would be connected from the reservoir 67 to the supply line 76. The substantially tangential, counter-flow sprays 72 still further react with the effluent, further reducing the temperature and further capturing more particulate solids as well as causing some of the more soluble gases of the effluent to enter solution.

The immediately foregoing steps take place in what is termed a secondary mixing chamber, designated by the reference numeral 81, and defined by the arcuate dome 71 and a depending, inverted, frusto-conical member 82.

The downwardly and inwardly sloping walls 83 of the inverted cone 82 terminate at the bottom in a circular lip 84 coincident with the upper end of a circular cylindrical ring 86 projecting downwardly, somewhat, into the main chamber 46.

The ring 86 encompasses the conduit walls 41 and is spaced outwardly therefrom to define an annular-in-section passageway 87 through which the partially cleaned effluent flows in passing downwardly from the secondary mixing chamber 81 to the main chamber 46.

As downward flow occurs through the passageway 87 a rotational component is imparted by a plurality of inclined guide vanes 88 formed in a frusto-conical plate 89 spanning the annular passageway 87.

Upon passing through the openings 91, formed by striking down the vanes 88 from the plate 89, the partially cleaned effluent has again assumed a spiral motion, more specifically a downward spiral motion.

Impinging against the descending effluent is a plurality of upwardly directed, upper water sprays 93 originating at upper nozzles 94 supplied by a circular pipe ring 96 connected to a water feed line 97 leading to the hydrant 68.

In comparable fashion, a water supply line 98 leads from the hydrant 68 to a ring 99 feeding a plurality of lower nozzles 101 effective to yield a lower set of large spray patterns 102 extending entirely between the central conduit walls 41 and the outer or jacket walls 26.

If desired, these sprays can also include a surface active agent as previously described.

In other words, the upper battery of sprays 93 and the lower sprays 102 entrap substantially all the particulate particles, such as unburned hydrocarbons and other materials, not previously captured. Additional soluble gases also go into solution.

Consequently, the effluent gases which recurve upwardly in the main chamber 46, in the manner indicated by the arrows 106 have had removed from them substantially all noxious compounds.

Such as remain are removed, for the most part, in an annular filter bed 112 encompassing the lower portion of the inverted frusto-conical member 82.

The filter bed 112 can be composed of activated charcoal, or comparable material, supported by a lower annular, foraminous screen member 113 supported on a bracket 114 on the jacket and an inner bracket 115 on the ring 86. Superposed on the filter bed is a hold-down screen 116. Preferably, the screens 113 and 116 are formed in segments so they can readily be inserted through the manhole opening 34 for installation, the manhole also being used for access for periodic renewal of the filter material.

After the effluent passes upwardly through the filter bed 112, the resultant gases are relatively cool and are substantially devoid of undesirable components. Consequently, as these gases flow upwardly through a plurality of flues 121 and upwardly through an exhaust stack 122 to discharge into the atmosphere, the effluent is quite clean, having undergone the series of pollutant-removing steps heretofore described.

Concurrently, the fluid produced by the various sprays 62, 72, 93, and 102 has absorbed the pollutants and flows downwardly through the openings 91 in the swirl plate 89, thence down along the outer walls of the conduit 41 and the inner walls of the jacket 17, as indicated by the arrows 131 and thence outwardly through a drain pipe 132 to a sump (not shown).

In the interest of avoiding water pollution, the sump fluid is preferably treated by a process forming no part of the present invention, but which is effective to remove the impurities, allowing the treated water to be returned to the manifold 68, in a closed circuit system along with such fresh, make-up water as is necessary to maintain the optimum flow to the various cleansing sprays in the effluent cleaner, as previously described.

It can therefore be seen that I have provided an apparatus which is effective to clean the effluent from incinerators and other waste material burners, and which thereby helps to reduce the extent of environmental pollution.

What is claimed is:
1. An effluent cleaner for a waste material burner comprising:
 (a) a vertical cylindrical jacket mounted on the burner and defining a main chamber;
 (b) a bottom cover plate mounted on the lower end of said jacket;
 (c) a dome mounted on the upper end of said jacket;
 (d) a vertical conduit open to the burner chamber, said conduit extending upwardly from said bottom plate and terminating below said dome, said conduit defining a primary mixing chamber;
 (e) an inverted frusto-conical member depending from said dome and encompassing said conduit in spaced relation to define an annular passageway, said member forming a secondary mixing chamber;
 (f) an exhaust stack above said dome;
 (g) a plurality of flues connecting said main chamber to said exhaust stack; and,
 (h) compressed air means located near the bottom of said conduit and directed upwardly for driving the waste effluent through said primary mixing chamber upwardly toward said dome, thence into said secondary chamber and through said passageway into said main chamber, thence through said flues into said exhaust stack for discharge therefrom.

2. A device as in claim 1 further including guide vanes adjacent the lower end of said conduit to direct the waste burner effluent into an upward path through said conduit, and a fluid spray nozzle mounted adjacent said compressed air means, said nozzle being effective to provide a spray covering the cross-sectional area of said conduit so as to engage with and entrap a substantial portion of the effluent impurities rising in said primary mixing chamber.

3. A device as in claim 2 wherein said guide vanes are arranged to direct the effluent into an upward spiral path.

4. A device as in claim 2 further including a plurality of spray producing nozzles between said dome and the upper end of said conduit, the spray being effective to remove impurities from the effluent within said secondary mixing chamber.

5. A device as in claim 4 further including a plurality of spray producing nozzles in said main chamber, the spray being capable of spanning said main chamber to remove impurities from the effluent in said main chamber; and means for removing the spray condensate containing the effluent impurities entrapped therein.

6. A device as in claim 5 further including a filter interposed between said main chamber and said flues to intercept impurities remaining in the effluent flowing from main chamber into said flues.

7. A device as in claim 2 wherein the fluid spray is a surfactant.

References Cited

UNITED STATES PATENTS

| 5,163 | 6/1847 | Butterfield et al. | |
| 336,311 | 2/1886 | Gordon | 110—119 |
| 2,978,998 | 4/1961 | Frankland | 110—18 |
| 3,395,656 | 8/1968 | Ford et al. | 110—18 |

JAMES W. WESTHAVER, *Primary Examiner.*

U.S. Cl. X.R.

55—236, 238, 242, 259; 110—119